United States Patent Office 3,095,357
Patented June 25, 1963

3,095,357
BETA-CAROTENE PRODUCTION
Roland C. Fulde, Downers Grove, Ill., assignor to Swift & Company, Chicago, Ill., a corporation of Illinois
No Drawing. Filed Feb. 8, 1960, Ser. No. 7,083
9 Claims. (Cl. 195—28)

This invention relates generally to the production of vitamin material. More particularly, the invention relates to a method for producing beta-carotene and related carotenoids.

Historically, beta-carotene, and the related carotenoid pigments, have been available only by separation from plant materials. Carotenoids are widely disseminated, being found with chlorophyll and xynthophyll in the green parts of plants; they also occur in carrots, many seeds, and several fats, thus the natural yellow color of butter. Various methods of recovery from plant material by the use of suitable mixtures of immiscible solvents are available. Recently, carotene has been chemically synthesized and recognized as a precursor of vitamin A, so vital for general well-being in man and animals. Human visual efficiency, for example, is closely related to and largely dependent upon the availability of this vitamin. Vertebrates, as a rule, appear unable to synthesize carotene or vitamin A, and that which they require must be taken in with their food.

More recently, it has been found that beta-carotene and other carotenoids may be produced by micro-organisms, particularly the yeasts and fungi belonging to the order Mucorales, disclosed and described in Patent No. 2,865,814 and Patent No. 2,890,989. The family Choanephoraceae has been found to be particularly effective. Such microbiological production of beta-carotene is usually carried out in a process referred to as "submerged fermentation" in which the carotene producing organisms are cultivated in a liquid nutrient medium under agitation. One such medium developed contains 2.3% cracked corn, 4.7% hexane extracted soybean meal, 4.0% vegetable oil or animal fat, thiamine, mono-basic potassium phosphate non-ionic detergent and beta-ionone. Carotene production begins after an incubation period of about 48 hours and continues for about 3 or 4 days thereafter. A filter cake is obtained containing up to 0.5% beta-carotene.

The utilization of beta-ionone in the nutrient medium and the addition of fatty materials are comparatively recent developments which have been found to be highly advantageous. Beta-ionone serves as a precursor for the production of beta-carotene and according to the submerged culture method, optimum yields are obtained when beta-ionone is added after the preliminary 48-hour incubation period.

The conditions attending the commercial practice of the submerged culture technique place undesirable restrictions on optimum production of carotenoids. For example, an amount of about 4% fatty material is the maximum which is advantageously tolerated in submerged culture. Larger amounts seem to have a deleterious effect on yields although it has been determined that improved growth and greater yields should theoretically be obtained with increased amounts of fatty material. Furthermore, the process is unwieldy and time consuming and generally inferior yields are obtained.

It is therefore an object of this invention to provide an improved process for the microbiological production of beta-carotene and related carotenoids which is more economical and more efficient than processes known heretofore.

It is a further object of this invention to provide a method for producing beta-carotene and related carotenoids which allow the use of optimum amounts of fatty materials.

It is a still further object of this invention to provide a process for cultivating growth of micro-organisms such that optimum yields of carotenoids are obtained with greatly reduced incubation periods.

Further objects and advantages, if not specifically set out, will become apparent to one skilled in the art during the course of the following description.

Broadly, this invention relates to the micro-biological production of beta-carotene and related carotenoids by a fermentation process referred to as "surface growth." I have found that growth of micro-organisms may be carried out efficiently and to remarkable advantage over prior methods by cultivating such growth on an air-interpenetrable aggregate of particulate surface-bearing materials. The increased mold growth and consequent improved carotenoid production may be largely correlated with the particular composition of the nutrient medium it is possible to utilize in surface growth.

More particularly, it has been found that optimum yields of beta-carotene from members of the family Choanephoraceae are obtained when the molds are cultivated by surface growth in the presence of a nutrient medium containing increased amounts of fatty materials. In the conventional submerged fermentation process it is necessary that the fat content of a nutrient medium not exceed about 4% to obviate a material decrease in beta-carotene yield. In the surface fermentation technique, however, amounts considerably greater than 4% may be used and when the fat content is in the preferred range of above about 8%, the yield of beta-carotene is unexcelled. The process is carried out generally by combining the fatty or fat soluble materials, mixing these with the surface-bearing material and any other dry ingredients, and dispersing thereon a blend of the appropriate organism or organisms and water or other suitable liquid. Thereafter the mixture is incubated under temperature and aerobic conditions conducive to active mold growth for from about 24 hours to several days. The length of incubation is largely a matter of economics, maximum carotene production being noted between 1 and 4 days.

The various cultures of the family Choanephoraceae may be cultivated in any convenient manner and in any medium which promotes abundant mycelial growth. Preferably, each organism may be cultivated according to methodology of continuous culture propagation. When the culture is needed for use in beta-carotene production, it may be drawn off and utilized.

Surface-bearing material found to be especially suitable for culture growth includes ground oat hulls, whole oat hulls, coarsely ground corn cobs, soybean hulls, cottonseed hulls, wheat bran, peanut hulls and sawdust. The particle size of a particular material depends largely on individual characteristics. For example, oat hulls offer optimum yield when ground to the fineness approximating ordinary flour. Corn cobs, on the other hand, are much more coarsely ground for maximum efficiency. Additionally, certain inorganic surface-bearing materials such as glass, stone, or metallic particles may be utilized when the size and configuration is such to allow good surface exposure.

The nutrient mixture may be of any type suitable for micro-organism growth, usually containing a base of carbohydrates such as starch or starch conversion products, proteins, either animal or vegetable, and characterized by the high fat content beneficially tolerated in surface culture. The optimum synthesis of carotene by micro-organism growth proceeds only when the fat content of the nutrient is greater than 4% and preferably above about 8%. Suitable fatty materials, defined as fatty acids and combined fatty acids, comprise generally any vegetable oil, any animal fat or their products of hydrolysis. More specifically, it has been found that the animal fats including white grease, yellow grease, brown grease, prime tallow, No. 2 tallow, No. 1 tallow or their products of hydrolysis, such as red oil (commercial oleic acid), are satisfactory. Additionally, vegetable fats such as corn oil, cottonseed oil, soybean oil, palm oil, coconut oil, olive oil, peanut oil or their products of hydrolysis are also satisfactory. A mixture of red oil and No. 2 tallow has been found to be particularly effective, more so than either alone.

One preferred nutrient composition comprises steamed soybean meal, red oil, tallow and beta-ionone. Another contains animal stick liquor, corn-steep water and red oil. Both compositions are, of course, used in conjunction with surface-bearing material which may or may not contribute additional nutritive factors. The grain portion of the nutrient culture mixture may or may not be subjected to an autoclaving procedure prior to its inclusion in the nutrient. Good results have been noted when autoclaving has not been practiced. This is due partly to the apparent selective action of the beta-ionone and partly since an incubation period of approximately 24 hours with a mass inoculation is short enough that contaminants initiating growth during this period are ordinarily not troublesome. Of course, if it is determined that contaminants are present and causing lower yields, autoclaving could be beneficial. This is generally true when the mixture of animal stick liquor and corn-steep water is used as a nutrient ingredient.

I have found that unlike the submerged culture technique wherein optimum yields of carotenoids are obtained when beta-ionone is added after 48 hours of incubation, the addition of the beta-ionone initially to the inoculated nutrient mixture serves the additional advantage of inhibiting growth of contaminating micro-organisms on the surface-bearing material. This permits the selective growth of carotene-producing molds and, consequently, the yield is increased.

The amounts of the fluid portions of the nutrient material utilized are such that after the appropriate organism or organisms are added, the surface-bearing material is coated or slightly moistened, allowing the mixture to remain in a loose, uncompacted and air-interpenetrable condition. The fluid portion, other than the fatty material, is generally water, which may be included in the inoculum of micro-organisms or added freely. Although the amount of moisture is not critical, optimum yields are produced when the moisture content is generally within the range of about 36% to about 46% of the inoculated nutrient mixture. The range may also vary with different surface-bearing material utilized so that the mixture preferably remains in a loose uncompacted state.

The incubation of the culture mixture may be carried out in various ways, using any type of equipment by which portions or layers of the material may be effectively incubated. It has been determined that the surface-bearing material used in cultivating the carotene-producing micro-organisms should not be agitated to any great extent during the early period of incubation. Therefore, any arrangement allowing substantially quiescent incubation together with free circulation of air, such as the conventional tray culture process, is suitable.

The operable hydrogen ion concentration for initiation of the incubation is generally in the range of 5 to 7, although the preferred optimum will vary with the particular micro-organisms and the particular nutrients used. When, for example, soybean meal with a pH of 6.5 to 6.6 is used, the addition to soybean hulls containing red oil and tallow lowers the pH to about 5.9 However, when the mixture of animal stick liquor and corn-steep water is used, the pH is adjusted to about 5.7 prior to autoclaving. Generally, no further adjustment of pH is necessary during the incubation period.

The amounts of inoculum added to the nutrient mixture is not critical. Ordinarily amounts of mixed or single strains in the range of about 10% to about 20% by volume of the complete nutrient mixture are used although slightly lesser or considerably greater amounts may be used with corresponding changes in yields for a given period during the early stages of incubation. The temperature of the incubation should be kept within the range of 20° to 35° C., with about 27° C. being optimum. A relative humidity of 100% is preferred though not necessary to minimize drying during incubation.

After incubation is complete, a dry particulate product is obtained which is high in beta-carotene content. This product may be fed to animals directly or mixed with other suitable feed ingredients. Alternately, the carotenoids may be extracted with a suitable solvent. Since beta-carotene is labile in the presence of oxygen, subsequent treatment of the cultured surface-bearing material should be ideally conducted in the absence of air. Extraction with a solvent meets this problem since the solvent atmosphere excludes air. Also, the carotene may be stabilized. It has been found that the use of antioxidants such as butylated hydroxyanisole (BHA), butylated hydroxytoluene (BHT), and santoquin may be added to the surface-bearing material together with the inoculum and the stability of the resulting carotene is greatly improved. For example, about .04 of 1% BHA increases the carotene stability of the resultant product which is dried in air for 24 hours and then held at 98° F. for 4 weeks. Larger amounts may be more effective.

The following examples are given by way of illustration and are not intended to limit this invention. Many variations and embodiments of the present invention may be made without departing from the spirit and scope thereof, the inventor being limited only as defined in the appended claims.

EXAMPLE I

A culture mixture comprising:

| | |
|---|---|
| Soybean hulls gm | 40 |
| 10% to 16% steamed soybean meal (50% protein) ml | 62 |
| Red oil gm | 4 |
| Tallow gm | 4 |
| Beta-ionone ml | 0.1 |
| Blakeslea trispora, NRRL 2456 ml | 8 |
| Blakeslea trispora, NRRL 2457 ml | 8 | was formulated by the following procedure. The red oil, tallow and beta-ionone were combined and added to the soybean hulls. The cultures and soybean meal-water blend were mixed thoroughly and dispersed rapidly on the hulls and fatty material with brief mixing. The final mixture was incubated at 27° C. for 24 hours in shallow pans. A dry product was obtained containing 487 micrograms of beta-carotene per gram of product (369,000 units vitamin A per pound).

The fat content of the nutrient in Example I was 11.4% on the basis of the complete mixture. In submerged culture techniques, a nutrient medium of this composition without the surface-bearing soybean hulls would promote only negligible amounts of beta-carotene in the 24-hour incubation period. Similarly, lowering the fat content to below 4% in surface culture would result in insignificant beta-carotene production.

I have found that the inoculum of micro-organisms will greatly increase the normal yield if it is filtered and resuspended in water. Blending the resuspended inoculum in a high speed blender further improves the yield. Filtering of the mycelium has an additional advantage in that the wet mycelial mat remains variable for extended periods of time and can be held in this state until ready for resuspending and blending. This enables preparation of a standardized inoculum by resuspending to a determined wet mycelial weight per unit volume. The following example illustrates the increased yields of the above procedure together with an increased amount of fat and the preferred oat hull surface-bearing material.

EXAMPLE II

A culture mixture comprising:

| | |
|---|---|
| Ground oat hulls | gm 40 |
| Soybean meal (50% protein) | gm 6 |
| Water | ml 27.9 |
| No. 2 tallow | ml 5 |
| Red oil | ml 5 |
| Beta-ionone | ml 0.1 |
| *Blakeslea trispora*, NRRL 2456 | ml 8 |
| *Blakeslea trispora*, NRRL 2457 | ml 8 | was prepared by combining the red oil, tallow and beta-ionone and adding the mixture to the ground oat hulls already containing the dry soybean meal. The cultures, both of which were filtered, resuspended in water and blended for 60 seconds, were mixed with the added water and dispersed (sprayed) on the fat coated hulls with minimum mixing. The final mixture was placed in an incubator at 27° C. for 40 hours in shallow pans. The dry product contained 819 micrograms of beta-carotene per gram of product (617,894 units vitamin A per pound).

The following example illustrates the results obtainable when using a mixture of animal stick liquor and corn-steep water as a nutrient ingredient.

EXAMPLE III

A culture mixture comprising:

| | |
|---|---|
| Soybean hulls | gm 40 |
| (5% animal stick liquor, 5% corn-steep water, 5% yeast extract) in water | ml 62 |
| Red oil | gm 8 |
| Beta-ionone | ml 1 |
| *Blakeslea trispora*, NRRL 2456 | ml 8 |
| *Blakeslea trispora*, NRRL 2457 | ml 8 | was prepared by mixing the beta-ionone with the red oil and adding the mixture to the dry soybean hulls. The aqueous mixture was cooked at 15 pounds steam pressure after pH adjustment to 5.7. The cultures were blended with the cooked mixture and dispersed on the fat coated hulls. The final mixture was placed in an incubator at 27° C. for 40 hours. The dry product contained 125 micrograms carotene per gram of product (94,300 units vitamin A per pound). This yield would be increased with the use of larger amounts of a mixture of red oil and tallow and with ground oat hulls as the surface-bearing material.

EXAMPLE IV

This example illustrates the fact that the process is applicable to organisms other than those noted in the preceding examples. Four mixtures of media were prepared according to Example II. The conditions of incubation were identical and also according to those of Example II. The inoculum was composed of 8 ml. each of the vegetative mycelium of the pairs of organism listed in the following table.

The carotene yields obtained with the various organisms are summarized in Table I.

*Table I*

| Organism Used | Beta-carotene micrograms per gram of product |
|---|---|
| *Blakeslea circinans* NRRL 2546 | 253 |
| *Blakeslea circinans* NRRL 2548 | |
| *C. cucurbitarum* NRRL A-6097 | 90 |
| *C. cucurbitarum* NRRL A-6098 | |
| *C. conjuncta* NRRL 2560 | 115 |
| *C. conjuncta* NRRL 2561 | |

The results noted in the use of surface growth methods indicate that optimal synthesis of beta-carotene by microorganism growth proceeds only when the fat content of the nutrient medium exceeds 4% and preferably is above about 8%. Amounts up to about 12% are particularly desirable although greater amounts may be tolerated. The advantages therein are most apparent when it is realized that significant carotene production according to the submerged culture technique is not initiated prior to 48 hours' incubation and the final product not obtained for 5 or 6 days.

It is clear that many modifications and variations of the invention as hereinbefore set forth may be made without departing from its spirit and scope, and, therefore, only such limitations should be imposed as are indicated in the appended claims.

I claim:

1. A process for producing carotenoids which comprises dispersing a culture of carotenoid-producing micro-organisms of the family Choanephoraceae on particulate surface bearing material, said material containing nutrients assimilable by said micro-organisms and characterized by greater than about 4% of fatty material selected from the group consisting of animal fats, vegetable oils, and fatty acids thereof, and incubating the inoculated material under surface aerobic conditions conducive to active propagation of the micro-organisms.

2. The process of claim 1 in which the content of fatty material is greater than about 8%.

3. A process for producing carotenoids which comprises dispersing a culture of mating type strains of carotenoid-producing micro-organisms of the family Choanephoraceae on particulate vegetable material, said material containing nutrients assimilable by said micro-organisms and having greater than about 4% of fatty material selected from the group consisting of animal fats, vegetable oils, and fatty acids thereof, and incubating the inoculated material under surface aerobic conditions conducive to active propagation of the micro-organisms.

4. The process of claim 3 in which the content of fatty material is greater than about 8%.

5. A process for producing carotenoids which comprises dispersing a culture of carotenoid-producing micro-organisms of the family Choanephoraceae on particulate surface bearing material, said material containing nutrients assimilable by said micro-organisms and having greater than about 4% of fatty material selected from the group consisting of animal fats, vegetable oils, and fatty acids thereof, and incubating the inoculated material under surface aerobic conditions, the initial pH of the incubation being within the range of about 5.0 to about 7.0 and the initial temperature being between about 20° C. and about 35° C.

6. The process of claim 5 in which the content of fatty material is greater than about 8%.

7. A process for producing carotenoids which comprises: preparing a nutrient medium containing carbohydrate, protein, a small amount of beta-ionone, and greater than 4% fatty material selected from the group consisting of animal fats, vegetable oils, and fatty acids thereof, mixing said medium with an air-interpenetrable aggregate of particulate surface-bearing materials, dispersing a culture of micro-organisms of the family Choanephoraceae on said surface-bearing materials, and incubating said micro-organisms under surface aerobic conditions for at least about 24 hours.

8. A process for producing beta-carotene which comprises: preparing a nutrient medium containing steamed soybean meal, a small amount of beta-ionone, and at least 8% fatty material, selected from the group consisting of animal fats, vegetable oils, and fatty acids thereof, mixing said medium with ground oat hulls, dispersing a culture of micro-organisms of the family Choanephoraceae on said hulls, and incubating said micro-organisms under surface aerobic conditions.

9. The process of claim 8 wherein the fatty material is a mixture of red oil and tallow.

References Cited in the file of this patent

UNITED STATES PATENTS 2,491,927    Martin _____ Dec. 20, 1949
2,890,989    Andersen _____ June 16, 1959

UNITED STATES PATENT OFFICE
CERTIFICATE OF CORRECTION

Patent No. 3,095,357　　　　　　　　　　　　　　　June 25, 1963

Roland C. Fulde

It is hereby certified that error appears in the above numbered patent requiring correction and that the said Letters Patent should read as corrected below.

Column 4, line 70, for "variable" read -- viable --; column 6, line 65, strike out "aggregate of particulate surface-bearing materials, dis-" and insert the same after "air-interpenetrable" in line 64, same column 6.

Signed and sealed this 31st day of December 1963.

(SEAL)
Attest:
ERNEST W. SWIDER　　　　　　　　　　　　　　　EDWIN L. REYNOLDS

Attesting Officer　　　　　　　　　　　　　　Acting Commissioner of Patents